(12) United States Patent
Corbaton et al.

(10) Patent No.: US 7,136,428 B2
(45) Date of Patent: Nov. 14, 2006

(54) SYSTEMS AND TECHNIQUES FOR MEASURING THE PERFORMANCE OF A COMMUNICATIONS SYSTEM

(75) Inventors: Ivan Jesus Fernandez Corbaton, San Diego, CA (US); John E. Smee, San Diego, CA (US); Srikant Jayaraman, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 1064 days.

(21) Appl. No.: 09/924,342

(22) Filed: Aug. 6, 2001

(65) Prior Publication Data

US 2003/0072390 A1 Apr. 17, 2003

(51) Int. Cl.
*H03K 9/00* (2006.01)
(52) U.S. Cl. .................. 375/316; 375/224; 455/226.1
(58) Field of Classification Search ............. 375/316, 375/346, 350, 224; 455/226.1, 226.3
See application file for complete search history.

(56) References Cited

U.S. PATENT DOCUMENTS 5,867,411 A * 2/1999 Kumar .................. 708/300

* cited by examiner

*Primary Examiner*—Temesghen Ghebretinsae
(74) *Attorney, Agent, or Firm*—Philip Wadsworth; Sandra L. Godsey; Kent D. Baker

(57) ABSTRACT

Systems and techniques for measuring the performance of a communications channel is disclosed which includes receiving a signal from the communications channel, filtering the signal, estimating a bias introduced by the filtering of the signal, and computing a parameter of the communications channel as a function of the estimated bias. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

68 Claims, 6 Drawing Sheets

SYSTEMS AND TECHNIQUES FOR MEASURING THE PERFORMANCE OF A COMMUNICATIONS SYSTEM

FIELD

The present invention relates generally to communications systems, and more specifically, to systems and techniques for measuring the performance of a communications system.

BACKGROUND

Communications systems are used for transmission of information from one device to another. The devices included in the communications system typically have either a transmitter, a receiver, or both. Before transmission, information is encoded by a transmitter's encoder into a format suitable for transmission over a communications channel. The communications channel may be a transmission line or free space between the transmitter and the receiver. As the signal propagates through the channel, the transmitted signal is distorted by imperfections in the channel. Furthermore, the signal experiences degradation from noise interference picked up during transmission. An example of interference commonly encountered in bandlimited channels is called inter-symbol interference (ISI). ISI occurs as a result of the spreading of a transmitted symbol pulse due to the dispersive nature of the channel which results in an overlap of adjacent symbol pulses. At the receiver, the signal is decoded and translated into its original pre-encoded form. Both the transmitter and receiver are designed to minimize the effects of channel imperfections and interference. For the purposes of this disclosure, interference or distortion due to channel imperfections, or any combination thereof will be referred to generally as noise.

Various receiver designs can be implemented to compensate for noise caused by the transmitter and the channel. By way of example, an equalizer is a common choice for dealing with ISI. An equalizer may be implemented with a transversal filter, i.e. a delay line with T-second taps (where T is the symbol duration). The output of the taps are amplified and summed to generate a "soft estimate" of the transmitted symbol. The tap coefficients are set to subtract the interference from symbols that are adjacent in time to the desired symbols. Commonly, an adaptive equalization technique is employed whereby the coefficients are continually and automatically adjusted. The adaptive equalizer uses a prescribed algorithm, such as "least mean square" (LMS) or "recursive least square" (RLS) to estimate the tap coefficients. The "soft estimate" is coupled to a decision making device such as a channel decoder or a slicer. The decision making device applies a threshold operation in order to arrive at a "hard estimate" of the symbol transmitted from the transmitter.

The ability of a receiver to detect a signal in the presence of noise is based on the ratio of the received signal power and the noise power. This ratio is commonly known as the signal-to-noise power ratio (SNR), or the carrier-to-interference ratio (C/I). Industry usage of these terms, or similar terms, is often interchangeable, however, the meaning is the same. Accordingly, any reference to C/I herein will be understood by those skilled in the art to encompass the broad concept of measuring the effects of noise at various points in the communications system.

Typically, the C/I can be computed in the receiver by evaluating soft symbol estimates of a known transmitted symbol sequence. This can be accomplished in the receiver by computing the C/I for the transmitted pilot signal. Since the pilot signal is known, the receiver can compute the C/I based on the soft symbol estimates from the equalizer. The resultant C/I computation can be used for a number of purposes. In communications systems employing a variable rate data request scheme, the receiver can communicate to the transmitter the maximum data rate it can support based on the C/I. Furthermore, if the receiver includes a turbo decoder, then depending on the transmitted constellation, the log likelihood ratio (LLR) computation needs an accurate estimate of the C/I.

When choosing the tap coefficients of the equalizer based on the minimum mean square error criterion, e.g., LMS, RLS, the soft symbol estimates may include a bias in their amplitude. This bias impacts the accuracy of the slicer effectively reducing the received constellation relative to the desired constellation. As a result, system performance is typically worse for larger constellations, such as 16-QAM or 64-QAM constellations as compared to a 4-PSK constellation. Moreover, the severity of this bias increases as the C/I decreases. Accordingly, a C/I computation that accounts for this bias is desirable to improve the receiver's demodulation performance as well as provide a more accurate C/I estimation for supporting variable data rate request schemes and turbo decoding.

SUMMARY

In one aspect of the present invention, a method of measuring performance of a communications channel includes receiving a signal from the communications channel, filtering the signal, estimating a bias introduced by the filtering of the signal, and computing a parameter of the communications channel as a function of the estimated bias.

In another aspect of the present invention, a receiver includes a filter configured to filter a signal from a communications channel, a bias estimator configured to estimate a bias introduced by the filter, and a parameter generator configured to compute a parameter of the communications channel as a function of the estimated bias.

In yet another aspect of the present invention, computer-readable media embodying a program of instructions executable by a computer performs a method of measuring performance of a communications channel from a filtered signal, the method includes estimating a bias introduced by the filtering of the signal, and computing a parameter of the communications channel as a function of the estimated bias.

In a further aspect of the present invention, a receiver includes filter means for filtering a signal from a communications channel, bias estimator means for estimating a bias introduced by the filter means, and parameter computation means for computing a parameter of the communications channel as a function of the estimated bias.

In yet a further aspect of the present invention, a communications system includes a first station having a filter configured to filter a signal from a communications channel, a bias estimator configured to estimate a bias introduced by the filter, and a parameter generator configured to compute a parameter of the communications channel as a function of the estimated bias, and a second station configured to transmit the signal to the first station over the communications system at a data rate selected from a plurality of different data rates, the selected data rate being a function of the computed parameter.

In another aspect of the present invention, a method of communications includes receiving, at a first station, a signal from a second station over a communications channel, filtering the signal at the first station, estimating, at the first station, a bias introduced by the filtering of the signal, computing, at the first station, a parameter of the communications channel as a function of the estimated bias, and transmitting from the second station to the first station the signal at a data rate selected from a plurality of different data rates, the selected data rate being a function of the computed parameter.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

Figure 1:
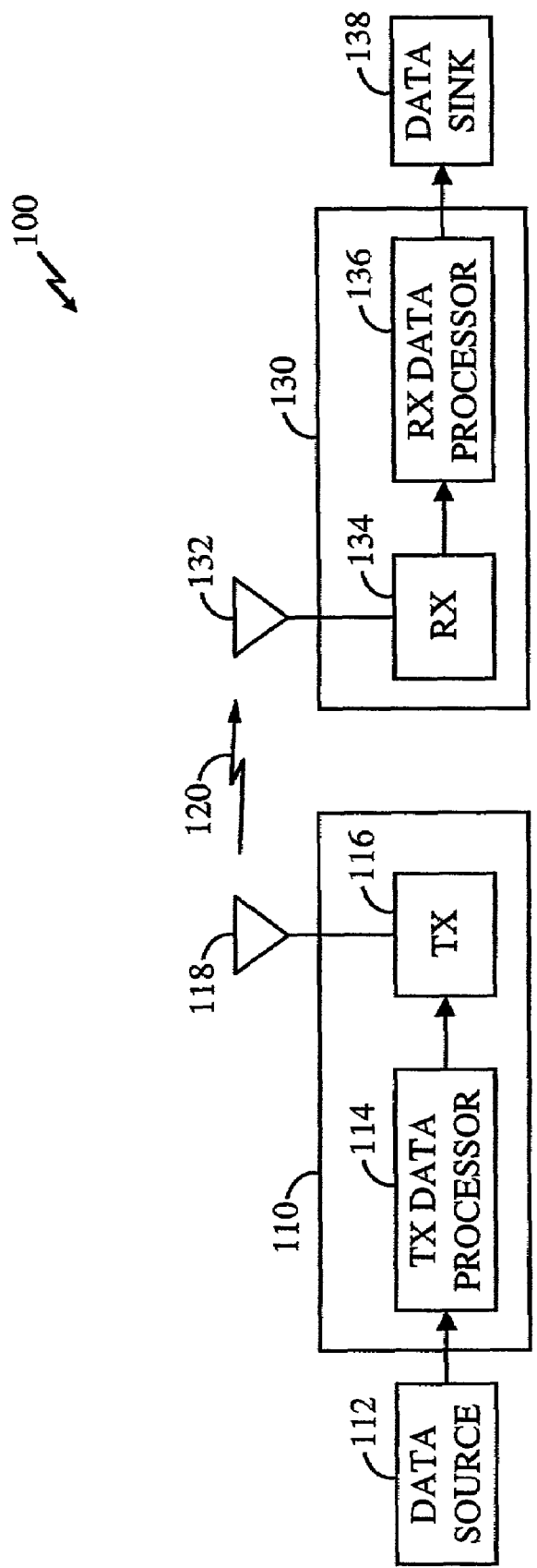
FIG. 1 is a block diagram of an exemplary communications system.

FIG. 1 is a simplified block diagram of an exemplary embodiment of a communications system 100. At a transmitter unit 110, data is sent, typically in packets, from a data source 112 to a transmitter data processor 114 that formats, encodes, and processes the data to generate one or more analog signals. The analog signals are then provided to a transmitter 116 that amplifies, filters, quadrature modulates, and upconverts the analog signals to generate a modulated signal suitable for transmission over a communications channel 120 via an antenna 118.

At a receiver unit 130, the transmitted signal is received by an antenna 132 and provided to a receiver 134. Within the receiver 134, the signal is amplified, filtered, frequency downconverted, quadrature demodulated, and digitized to provide inphase (I) and quadrature (Q) samples. The samples may be digitally processed and then provided to a receiver data processor 136 that further processes and decodes the samples to recover the transmitted data. The processing and decoding at the receiver data processor 136 are performed in a manner complementary to the processing and encoding performed at transmitter data processor 114. The decoded data is then provided to a data sink 138.

Figure 2:
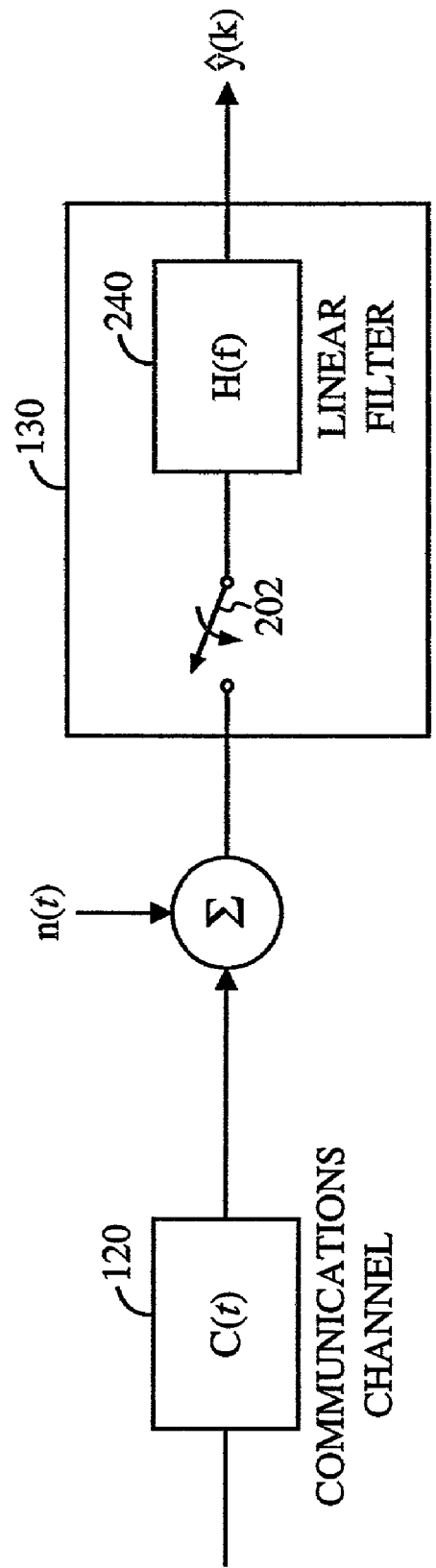
FIG. 2 is a block diagram of an exemplary signal model for a communications channel and a receiver with adaptive least mean square equalization.

FIG. 2 is an exemplary signal model with adaptive LMS equalization. The exemplary signal model is used to represent transmitted symbols y(k) modulated by a carrier propagating though a dispersive communications channel c(t) 120 corrupted by AWGN (Additive White Gaussian Noise) n(t). The receiver 130 is modeled with a sampler 202 followed by a linear filter 204, such as an FIR (Finite Impulse Response) filter H(f). The signal is sampled at a rate $T_s$ which can be different from the symbol rate T. The filter 240 provides soft estimates ŷ(k) of the transmitted symbols y(k). The transmitted symbols may include a pilot sequence and a data sequence. During the pilot sequence of the transmission, the linear filter 204 adapts its coefficients by means of an unconstrained LMS algorithm. During the data sequence of the transmission, the receiver generates hard symbol estimates from the soft symbol estimates.

The output of the linear filter can be defined as follows:

$$\hat{y}(k) = (\alpha_{re} + j\alpha_{im})y(k) + w(k) \quad (1)$$

where $w(k)+j\alpha_{im}y(k)$ is the remaining undesired component at the output of the linear filter. For the ideal filter, there would be no imaginary component on the bias α. The desired component is $\alpha_{re}y(k)$.

Since the pilot sequence of the transmission y(k) is non-zero and known, the real component of the bias $\alpha_{re}$ can be estimated. By way of example, assuming that y(k) and w(k) are uncorrelated, one could compute the following statistic:

$$\hat{\alpha}_{re} = \text{Re}\left\{\frac{1}{N}\sum_{k=1}^{N}\frac{\hat{y}(k)}{y(k)}\right\} \quad (2)$$

where N represents the number of pilot symbols.

Once the real component of the bias $\alpha_{re}$ is estimated, one skilled in the art will recognize that there are numerous ways to minimize or eliminate its impact on the symbol estimates. By way of example, the symbol estimates could be divided by the real component of the bias $\hat{\alpha}_{re}$ to effectively scale the received constellation to the reference constellation. Alternatively, the reference constellation can be scaled by the real component of the bias $\hat{\alpha}_{re}$ to effectively shrink the reference constellation to the received constellation.

Having estimated the real component of the bias $\alpha_{re}$, the performance of the receiver can now be estimated. By way of example, the C/I at the output of the linear filter can be estimated by dividing the square of the mean energy of the transmitted symbols y(k) by the square of the mean noise energy. As indicated above in connection with equation (1), the undesired remaining component at the output of the linear filter is $w(k)+j\alpha_{im}y(k)$. Taking into account the real component of the bias $\alpha_{re}$ when computing the mean square energy, the estimated C/I at the output of the linear filter can be expressed as:

$$\frac{\hat{C}}{I} = \frac{\hat{\alpha}_{re}^2\left\{\frac{1}{N}\sum_{k=1}^{N}\|y(k)\|^2\right\}}{\frac{1}{N}\sum_{k=1}^{N}\{\|w(k)\|^2 + \alpha_{im}^2\|y(k)\|^2\}} \quad (3)$$

where N represents the number of pilot symbols.

The denominator in equation (3) can be computed using a derivation of a mean square error (MSE) estimate. The MSE is estimated by a temporal average in place of the statistical expected value:

$$\hat{MSE} = \frac{1}{N} \sum_{k=1}^{N} \{\|y(k) - \hat{y}(k)\|^2\} \quad (4)$$

where N represents the number of pilot symbols.

Substituting equation (1) for ŷ(k) into equation (4), the MSE can be rewritten as:

$$\hat{MSE} = (1 - \alpha_{re})^2 \cdot \frac{1}{N} \sum_{k=1}^{N} \{\|y(k)\|^2\} + \frac{1}{N} \sum_{k=1}^{N} \{\|w(k)\|^2 + \alpha_{im}^2 \|y(k)\|^2\} \quad (5)$$

By inspecting equation (5), one can see that the last term in equation (5) is the same as the denominator in equation (3). Accordingly, equation (3) can be rewritten as:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \alpha_{re})^2 \cdot \frac{1}{N} \sum_{k=1}^{N} \{\|y(k)\|^2\}} \quad (6)$$

Where the first term in the denominator is the MSE estimate defined in equation (4) and N represents the number of pilot symbols. The final step is to replace the bias $\alpha_{re}$ in equation (6) with the estimated bias $\hat{\alpha}_{re}$ derived in equation (2) as follows:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \hat{\alpha}_{re})^2 \cdot \frac{1}{N} \sum_{k=1}^{N} \{\|y(k)\|^2\}}. \quad (7)$$

The implementation of equation (6) allows one to use the real portion of the bias estimate from equation (2) with the MSE estimate of equation (4) to compute the C/I.

The generality of exemplary signal model can be extended to any receiver that requires an estimate of its performance. By way of example, the exemplary signal model can be applied to receivers supporting mobile radio systems. One such mobile radio system is a code division multiple access (CDMA) communications system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random binary sequence that modulates a carrier, and thereby, spreads the spectrum of the signal waveform. The transmitted signals are separated in the receiver by a correlator that uses a corresponding pseudo-random binary sequence to despread the desired signal's spectrum. The undesired signals, whose pseudo-random binary sequence do not match, are not despread in bandwidth and contribute only to noise.

For CDMA communications systems designed to transmit at higher data rates, such as a High Data Rate (HDR) communications system, a variable data rate request scheme may be used to communicate at the maximum data rate that the C/I can support. The HDR communications system is typically designed to conform to one or more standards such as the "cdma2000 High Rate Packet Data Air Interface Specification," 3GPP2 C.S0024, Version 2, Oct. 27, 2000, promulgated by a consortium called "3$^{rd}$ Generation Partnership Project." The contents of the aforementioned standard is incorporated by reference herein.

Figure 3:
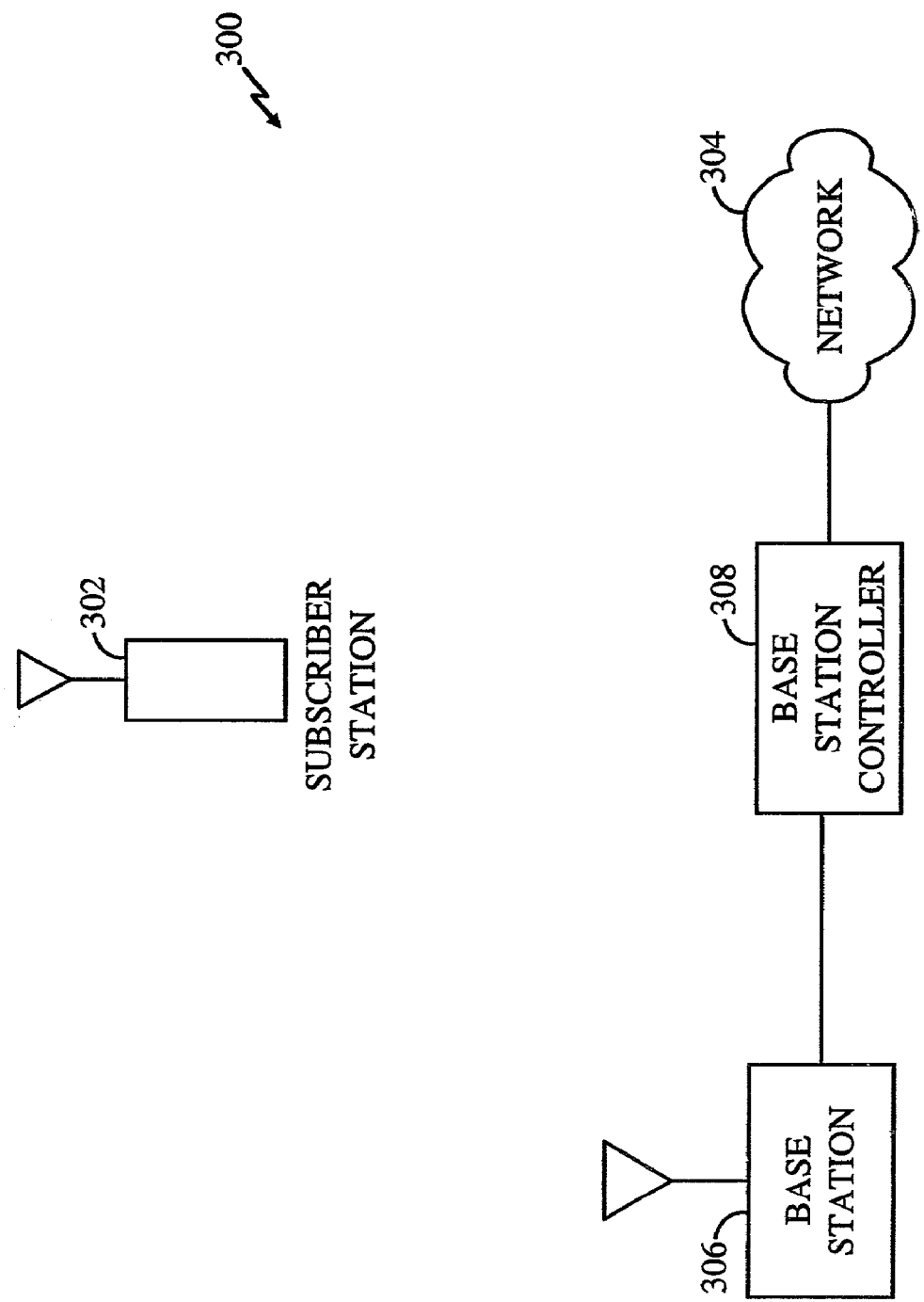
FIG. 3 is a block diagram of an exemplary High Data Rate (HDR) communications system employing a variable rate data request scheme.

An exemplary HDR communications system employing a variable rate data request scheme is shown in FIG. 3. The exemplary HDR communications system 300 includes a subscriber station 302 in communication with a land-based data network 304 by transmitting data on a reverse link to a base station 306. The base station 306 receives the data and routes the data through a base station controller (BSC) 308 to the land-based network 304. Conversely, communications to the subscriber station 302 can be routed from the land-based network 304 to the base station 306 via the BSC 308 and transmitted from the base station 306 to the subscriber station 302 on a forward link. The forward link refers to the transmission from the base station to the subscriber station and the reverse link refers to the transmission from the subscriber station to the base station.

The communications system shown in FIG. 3 depicts a single base station 306 in communication with a single subscriber station 302 for ease of explanation. As those skilled in the art will appreciate, the forward link transmission can occur between the base station and one or more subscriber stations. Similarly, the reverse link transmission can occur between one subscriber station and one or more base stations.

In the exemplary HDR communications system, the forward link data transmission from the base station 306 to the subscriber station 302 should occur at or near the maximum data rate which can be supported by the forward link. Initially, the subscriber station 302 establishes communication with the base station 306 using a predetermined access procedure. In this connected state, the subscriber station 302 can receive data and control messages from the base station 306, and is able to transmit data and control messages to the base station 306. The subscriber station 302 then estimates the C/I of the forward link transmission from the base station 306. The C/I of the forward link transmission can be obtained by measuring the pilot signal from the base station 306. Based on the C/I estimation, the subscriber station 302 transmits to the base station 306 a data request message (DRC message) on the data request channel (DRC channel). The DRC message can contain the requested data rate or, alternatively, an indication of the quality of the forward link channel, e.g., the C/I measurement itself, the bit-error-rate, or the packet-error-rate. The base station 306 uses the DRC message from the subscriber station 302 to efficiently transmit the forward link data at the highest possible rate.

Figure 4:
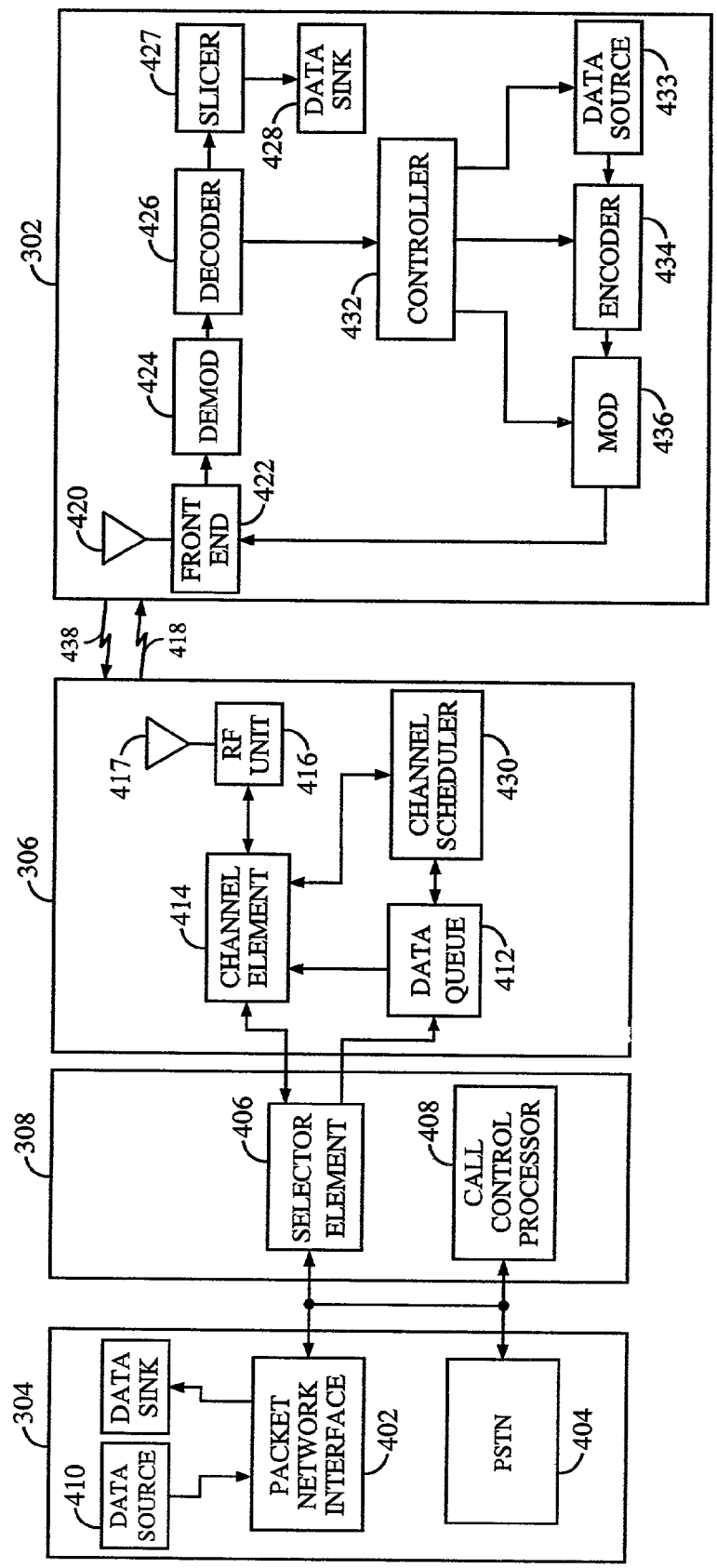
FIG. 4 is block diagram illustrating the basic subsystems of the exemplary HDR communications system of FIG. 3.

FIG. 4 is block diagram illustrating the basic subsystems of the exemplary HDR communications system. The BSC 308 interfaces with a packet network interface 402, a PSTN 404, and all base stations in the exemplary HDR communication systems (only one base station 306 is shown for simplicity). The BSC 308 coordinates the communication between numerous subscriber stations in the exemplary HDR communications system and other users connected to packet network interface 402 and the PSTN 404. The PSTN 404 interfaces with users through the standard telephone network (not shown in FIG. 4).

The BSC 308 contains many selector elements, although only one selector element 406 is shown for simplicity. One selector element 406 is assigned to control the transmissions between one or more base stations in communication with the subscriber station 302. If selector element 406 has not been assigned to the subscriber station 302, a call control processor 408 is informed of the need to page the subscriber station 302. The call control processor 408 then directs base station 306 to page the subscriber station 302.

A data source 410 contains the data which is to be transmitted to the subscriber station 302. The data source 410 provides the data to the packet network interface 402. The packet network interface 402 receives the data and routes the data to the selector element 406. The selector element 406 sends the data to each base station in communication with the subscriber station 302. Each base station maintains a data queue 412 which contains the data to be transmitted to subscriber station 302.

The data from the data queue 412 is coupled to a channel element 414. The channel element 414 partitions the data into packets and appends control fields, frame check sequence bits, and code tail bits to each data packet. The channel element 414 then encodes the data packets and interleaves (or reorders) the symbols within the encoded packets. Next, the interleaved packet is scrambled with a scrambling sequence and covered with Walsh covers. The scrambled data packet is then punctured to accommodate a pilot signal and power control bits, and spread with a long PN code and short $PN_I$ and $PN_Q$ codes. The spread data packet is quadrature modulated, filtered, and amplified by a transmitter within an RF unit 416. The forward link signal is transmitted over the air through an antenna 417 on the forward link 418.

The system control and scheduling functions can be implemented in various ways such as a channel scheduler 430. The location of the channel scheduler 430 is dependent on whether a centralized or distributed control/scheduling processing is desired. By way of example, for distributed processing, the channel scheduler 430 can be located within the base station 306. Conversely, for centralized processing, the channel scheduler 430 can be located within the BSC 308 and can be designed to coordinate the data transmissions for multiple base stations.

In the described exemplary embodiment, the channel scheduler 430 coordinates the forward link data transmissions of the base station 306. The channel scheduler 430 connects to the data queue 412 and the channel element 414 within the base station 306 and receives the queue size, which is indicative of the amount of data to transmit to the subscriber station 302, and the DRC message from the subscriber station 302. In response, the channel scheduler 430 schedules the data rate for the forward link transmission to maximize data throughput and minimize transmission delay.

Figure 5:
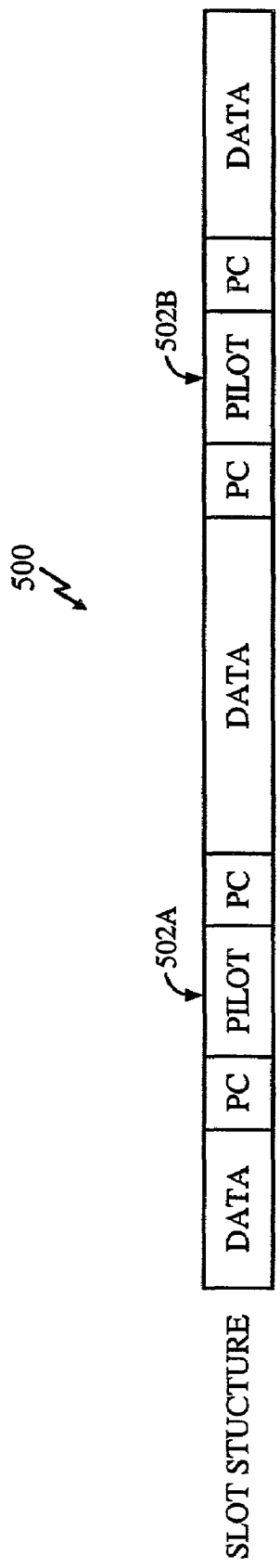
FIG. 5 is a diagram illustrating a forward link slot structure for the exemplary HDR communications system of FIG. 3.

The forward link pilot channel provides a pilot signal which can be used by the subscriber station 302 for initial acquisition, phase recovery, timing recovery, and ratio combining. In addition, the pilot signal can also used by subscriber station 302 to perform the C/I measurement. A diagram illustrating the forward link pilot signal is shown in FIG. 5. In the described exemplary embodiment, each time slot 500 is 2048 chips long with two pilot bursts 502A and 502B occurring at the end of the first and third quarters of the time slot. Each pilot burst 502 is 96 chips in duration.

Turning back to FIG. 4, the forward link transmission is received by an antenna 420 at the subscriber station 302. The received signal is routed from the antenna 420 to a receiver within a front end 422. The receiver filters and amplifies the signal, downconverts the signal to baseband, quadrature demodulates the baseband signal, and digitizes the baseband signal. The digitized baseband signal is coupled to a demodulator 424. The demodulator 424 includes carrier and timing recovery circuits and further includes an equalizer. The equalizer compensates for ISI and generates soft symbol estimates from the digitized baseband signal. The soft symbol estimates are coupled to a controller 432 to generate the DRC message in a manner to be described in greater detail later. The soft symbol estimates are despread with the long PN code and the short $PN_I$ and $PN_Q$ codes, decovered with the Walsh covers, and descrambled in the demodulator 424. The demodulated data is provided to a decoder 426 which performs the inverse of the signal processing functions done at the base station 306, specifically the de-interleaving, decoding, and frame check functions. The decoded data is provided to a slicer 427 which generates a hard symbol estimates. The hard symbol estimates are coupled to a data sink 428.

In addition to generating the DRC message, the controller 432 can be used to support data and message transmissions on the reverse link. Specifically, the controller 432 provides synchronization and timing between a data source 433, an encoder 434 and a modulator 436. The controller 432 can be implemented in a microcontroller, a microprocessor, a digital signal processing (DSP) chip, an ASIC programmed to perform the function described herein, or any other implementation known in the art.

The data source 433 provides data to the encoder 434 for reverse link transmission from the subscriber station 302 to the base station 306. The encoder 434 generates and appends to the data a set of CRC bits, and a set of code tail bits. The encoder 434 encodes and interleaves the data and the appended bits. The interleaved data is provided to a modulator 436.

The modulator 436 can be implemented in a variety of fashions. In the described exemplary embodiment, the interleaved data is covered with Walsh codes, spread with a long PN code, and further spread with the short PN codes. In addition, the DRC message from the controller 432 is covered by a Walsh code and time division multiplexed with a pilot signal. The DRC message and pilot signal are spread with short PN codes and summed with the spread data. The summed data is provided to a transmitter within the front end 422. The transmitter modulates, upconverts, filters, amplifies, and transmits the summed data over the air, through the antenna 420, on a reverse link 438.

Figure 6:
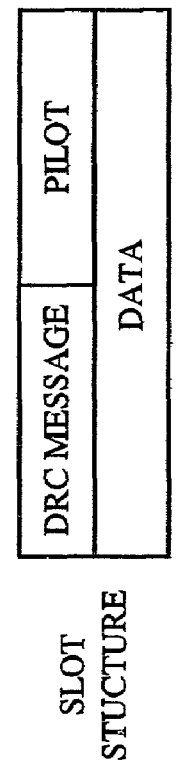
FIG. 6 is a diagram illustrating a reverse link slot structure for the exemplary HDR communications system of FIG. 3.

A diagram of the exemplary reverse link slot structure is illustrated in FIG. 6. In the described exemplary embodiment, the reverse link slot structure is similar to the forward link slot structure in that each time slot is 2048 chips long. However, on the reverse link, the data is not time division multiplexed, but rather occupies a single code channel all of the time. The pilot signal and the DRC message are time division multiplexed and occupy a single code channel different from the data code channel. In the time domain, the code channels appear on top of each other.

Turning back to FIG. 4, the reverse link signal is received by the antenna 417 at the base station 306 and provided to the RF unit 416. The RF unit 416 filters, amplifies, downconverts, demodulates, and digitizes the signal and provides the digitized signal to the channel element 414. The channel element 414 despreads the digitized signal with the short PN codes and the long PN code. The channel element 414 also performs the Walsh code decovering, and pilot and DRC extraction. The base station 306 uses the DRC message to efficiently transmit forward link data at the highest possible rate. The channel element 414 then reorders the demodulated data, decodes the de-interleaved data, and performs the CRC check function. The decoded data is provided to the selector element 406 in the BSC 308. The selector element 406 routes the data or message to the appropriate destination.

Figure 7:
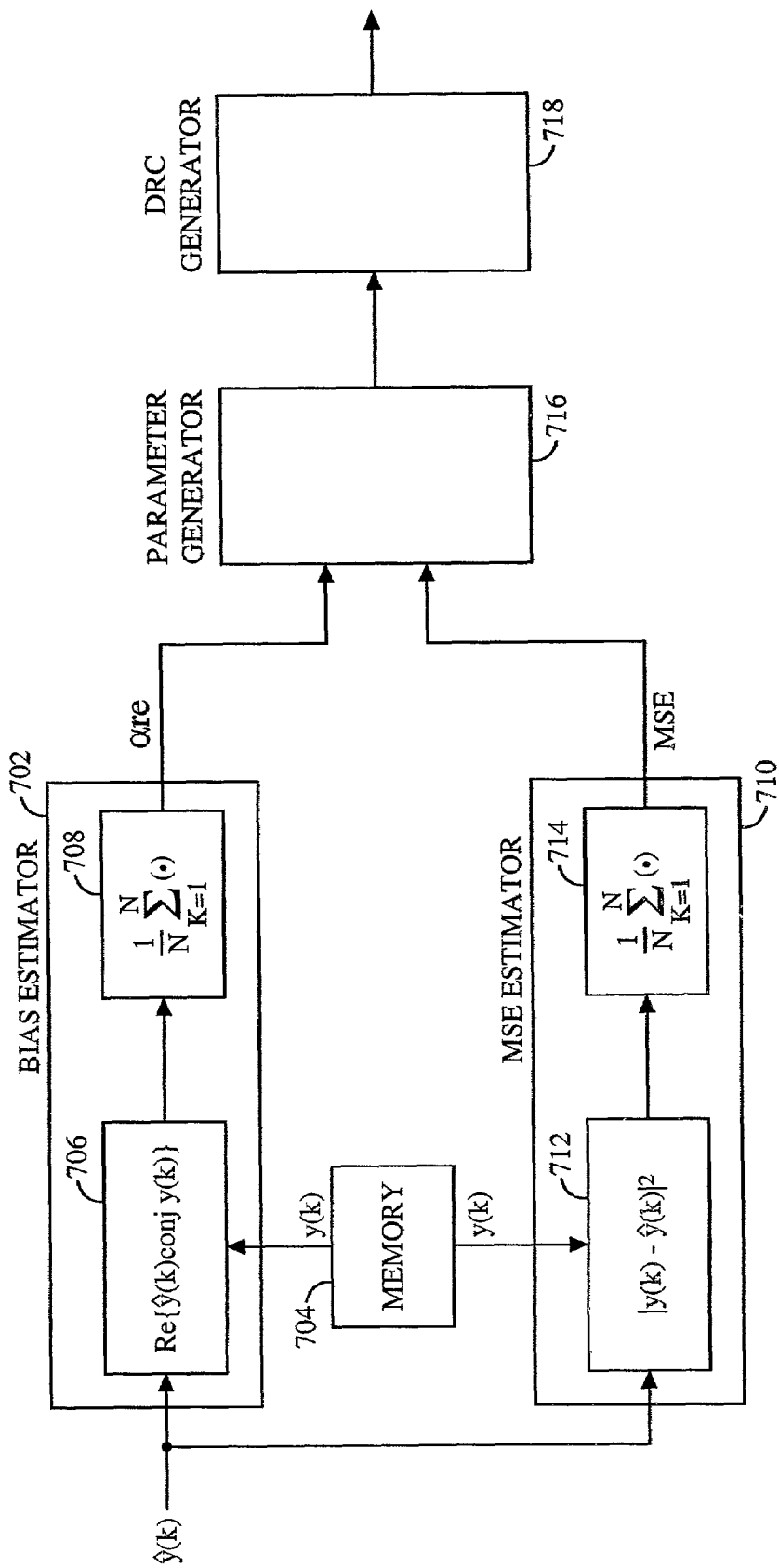
FIG. 7 is a block diagram of an exemplary subsystem for generating a DRC message from soft symbol estimates generated by an equalizer.

FIG. 7 is an exemplary functional block diagram of a portion of the controller used to generate the DRC message from the soft symbol estimates generated by the equalizer. In the described exemplary embodiment, the generation of the DRC message can be performed in the controller 432 (see FIG. 4). Alternatively, the DRC message generation can be performed in the decoder 426, the encoder 434, or in any other functional block described herein in connection with the subscriber station 302.

The real component of the bias $\alpha_{re}$ introduced by the equalizer is computed during the pilot sequence of the forward link transmission. Specifically, the soft symbol estimates from the equalizer are coupled to a bias estimator 702 together with the pilot symbol sequence stored in memory 704. Since the pilot symbol sequence transmitted on the forward link is known a priori, the identical symbol sequence can be stored in memory 704 at the subscriber station. The bias estimator 702 is used to perform the algorithm set forth in equation (2). If the pilot symbol sequence is two streams of (+1) and (−1), one for the I component and one for the Q component, equation (2) can be rewritten as follows:

$$\hat{\alpha}_{re} = \frac{1}{N} \sum \frac{1}{2} \text{Re}\{\hat{y}(k) \cdot y(k)^*\} \quad (8)$$

where []* represents the complex conjugate. If the I and Q components of the pilot symbol sequence is anything other than (+1) and (−1), the scaling component introduced must be accounted for in the bias estimation.

Equation (8) can be implemented with a multiplier 706 and a bias accumulator 708. The multiplier 706 extracts the real component of the dot product between each soft symbol estimate and its corresponding pilot symbol. The real component of each dot product from the multiplier 706 is accumulated by the bias accumulator 708. The final accumulation is then divided by the number of dot products fed to the bias accumulator 708 to generate the real component of the bias $\alpha_{re}$.

Once the real component of the bias $\alpha_{re}$ is estimated, it can be fed back to the equalizer in the demodulator 424 (see FIG. 4) to scale the soft symbol estimates fed to the decoder. This approach has the effect of scaling the received constellation to a reference constellation. Alternatively, the real component of the estimated bias $\alpha_{re}$ can be used to scale the reference constellation to the received constellation. Either way, by accounting for the bias $\alpha$ introduced by the equalizer, the symbol error rate should be reduced thereby improving overall system performance.

The soft symbol estimates from the equalizer are also coupled to an MSE estimator 710 together with the pilot symbol sequence from memory 704. The MSE estimator 710 is used to estimate the MSE to perform with algorithm set forth in equation (4). Specifically, the MSE estimate can be computed using a difference operator 712 and an MSE accumulator 714. The difference operator 712 generates an output sequence comprising the square of the difference between each soft symbol estimate from the equalizer and its corresponding pilot symbol from memory 704. The output sequence of the difference operator 712 is accumulated by the MSE accumulator 714. The final accumulation is then divided by the number of times the output sequence was accumulated, e.g., the number of symbols in the pilot sequence.

The real component of the estimated bias $\alpha_{re}$ from the bias estimator 702 and the estimated MSE from the MSE estimator 710 are provided to a parameter generator 716. In the described exemplary embodiment, the parameter generator 716 computes the C/I using equation (7).

Although the procedures for estimating the C/I have been described with the real component of the bias $\alpha_{re}$ and the MSE estimated beforehand, those skilled in the art will appreciate that the C/I estimation can be computed directly in the parameter generator by manipulating equation (7) without the need to separately compute the real component of the bias estimate $\alpha_{re}$ or the MSE. Moreover, as those skilled in the art will appreciate, various other algorithms may be implemented to perform a C/I estimation that takes into account the bias $\alpha_{re}$ introduced by the equalizer without departing from the scope of the present invention.

The estimated the C/I from the parameter generator 716 can be provided to a DRC generator 718 for generating the DRC message. In the described exemplary embodiment, the data rates supported by the base station 306 (see FIG. 4) are predetermined and each supported data rate is assigned a unique DRC message. The DRC generator selects one of the DRC messages based on the C/I estimate using any conventional approach known in the art such as a look-up table. An exemplary look-up table is shown below and identified as Table 1. The precise implementation of the DRC generator 718 can take on various forms including, by way of example, an algorithm implemented in hardware, firmware or software, or a look-up table stored in memory such as an EEPROM or RAM.

With reference to Table 1, the number of data rates supported is generally limited by the quality of the C/I estimate. As the number of supported data rates increase the rate difference between the supported rates decrease (assuming that the minimum and maximum data rates remain essentially unchanged). As a result, improved C/I estimates are needed to discriminate between different data rates that can be demodulated at the subscriber station. Accordingly, a C/I estimate that takes into account the bias a introduced by the equalizer will generally be able to support a greater number of data rates than conventional approaches to C/I estimation. The particular data rate that can be supported by a given C/I estimate is a function of the receiver architecture, i.e., the ability of the subscriber station to decode a signal in the presence of noise. Accordingly, this relationship is not shown in Table 1. The relationship between the data rate and the C/I estimate can be readily determined by techniques well known in the art based on the specific design of the subscriber station and other system parameters.

Since the DRC message constitutes part of the packet overhead on the reverse link transmission, a further trade-off exists between the number of data rates supported and the number of bits needed for the DRC message. In the described exemplary embodiment, the number of data rates supported is twelve (12) and a 4-bit DRC message is used to identify the requested data rate. As those skilled in the art will appreciate, numerous variations from Table 1 are within the scope of the present invention. By way of example, the number of data rates supported can be different, the specific data rates identified in Table 1 can be different, and the relationship between the C/I estimates and the supported data rates can also be different.

TABLE 1

| DRC MESSAGE | DATA RATE (kbps) |
|---|---|
| 0 × 0 | Null rate |
| 0 × 1 | 38.4 |
| 0 × 2 | 76.8 |
| 0 × 3 | 153.6 |
| 0 × 4 | 307.2 |
| 0 × 5 | 307.2 |
| 0 × 6 | 614.4 |
| 0 × 7 | 614.4 |
| 0 × 8 | 921.6 |
| 0 × 9 | 1228.8 |
| 0 × a | 1228.8 |
| 0 × b | 1843.2 |
| 0 × c | 2457.6 |
| 0 × d | Invalid |
| 0 × e | Invalid |
| 0 × f | Invalid |

In CDMA communications systems, or any other type of communications system which uses diversity techniques to combat fading, a RAKE receiver may be used in addition to, or instead of the equalizer described above in connection with the demodulator of FIG. 4. The RAKE receiver in a CDMA communications system typically utilizes independent fading of resolvable multipaths to achieve diversity gain. Specifically, the RAKE receiver can be configured to process one or more multipaths of a forward link transmission. Each multipath signal is fed into a separate finger processor to perform PN code despreading, Walsh code decovering, and coherent demodulation. The RAKE receiver then combines the demodulated signal from each finger processor to recover the symbols transmitted over the forward link.

In most practical implementations employing a RAKE receiver, the noise at the outputs of the finger processors are assumed to be uncorrelated. Under this assumption, the C/I at the output of the RAKE receiver is the sum of the C/I estimates for each finger processor. However, if the outputs of the finger processors are correlated, e.g., when the finger processors are placed relatively close to each other, this method of estimating combined C/I can be inaccurate. The exemplary C/I estimations described above can be applied to the RAKE receiver to yield an accurate estimate of the C/I with little computational complexity, i.e., without matrix inversions. Recognizing that the symbols at the output of the RAKE receiver can also be described by equation (1), the real component of the bias $\alpha_{re}$ estimate from equation (2) can then be used to compute a C/I estimation in the manner described in connection with FIG. 7.

Those skilled in the art will appreciate that the various illustrative logical blocks, modules, circuits, and algorithms described in connection with the embodiments disclosed herein maybe implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein maybe applied to other embodiments without departing from the spirit or scope of the invention. Thus, the present invention is not intended to be limited to the embodiments shown herein but is to be accorded the widest scope consistent with the principles and novel features disclosed herein.

The invention claim is:

1. A method of measuring performance of a communications channel, comprising:
    receiving a signal from the communications channel;
    filtering the signal;
    estimating a bias introduced by the filtering of the signal; and
    computing a parameter of the communications channel as a function of the estimated bias, wherein the signal filtering comprises generating a plurality of symbol estimates, the bias estimation being a function of the symbol estimates.

2. The method of claim 1 wherein the bias estimation is further a function of a plurality of second symbols corresponding to the symbol estimates.

3. The method of claim 2 wherein the signal comprises a pilot signal.

4. The method of claim 2 wherein the bias estimation further comprises solving the following equation:

$$\hat{\alpha}_{re} = \text{Re}\left\{ \frac{1}{N} \sum_{k=1}^{N} \frac{\hat{y}(k)}{y(k)} \right\}$$

where:
ŷ(k) represents the estimated symbols;
y(k) represents the corresponding second symbols; and
N represents the number of samples.

5. A method of measuring performance of a communications channel, comprising:
receiving a signal from the communications channel;
filtering the signal;
estimating a bias introduced by the filtering of the signal;
computing a parameter of the communications channel as a function of the estimated bias; and
estimating a mean square error of the signal, the parameter computation further being a function of the estimated mean square error.

6. A method of measuring performance of a communications channel, comprising:
receiving a signal from the communications channel;
filtering the signal;
estimating a bias introduced by the filtering of the signal; and
computing a parameter of the communications channel as a function of the estimated bias, wherein the parameter computation further comprises computing a carrier-to-interference ratio of the signal.

7. The method of claim 6 wherein the signal filtering comprises generating a plurality of symbol estimates, and the carrier-to-interference ratio computation comprises solving the following equation:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \alpha_{re})^2 \cdot \frac{1}{N} \sum_{k=1}^{N} \{\|y(k)\|^2\}} \quad (6)$$

where:
y(k) represents a plurality of second symbols corresponding to the symbol estimates;
N represents the number of samples; and
$\hat{\alpha}_{re}$ represents the real component of the estimated bias.

8. A receiver, comprising:
a filter configured to filter a signal from a communications channel, wherein the filter comprises a linear filter, wherein the linear filter comprises a plurality of coefficients configured to be adapted by a least mean square algorithm;
a bias estimator configured to estimate a bias introduced by the filter; and
a parameter generator configured to compute a parameter of the communications channel as a function of the estimated bias.

9. The receiver of claim 8 wherein the filter comprises a finite impulse response filter.

10. The receiver of claim 8 wherein the filter comprises an equalizer.

11. The receiver of claim 8 wherein the filter comprises a RAKE receiver.

12. A receiver, comprising:
a filter configured to filter a signal from a communications channel;
a bias estimator configured to estimate a bias introduced by the filter; and
a parameter generator configured to compute a parameter of the communications channel as a function of the estimated bias, wherein the filter is further configured to generate a plurality of symbol estimates from the signal, the estimated bias further being a function of the symbol estimates.

13. The receiver of claim 12 wherein the estimated bias is further a function of a plurality of second symbols corresponding to the symbol estimates.

14. The receiver of claim 13 wherein the bias estimator is configured to estimate the bias introduced by the filter by solving the following equation:

$$\hat{\alpha}_{re} = \text{Re}\left\{ \frac{1}{N} \sum_{k=1}^{N} \frac{\hat{y}(k)}{y(k)} \right\}$$

where:
ŷ(k) represents the estimated symbols; and
y(k) represents the corresponding second symbols; and
N represents the number of samples.

15. A receiver, comprising:
a filter configured to filter a signal from a communications channel;
a bias estimator configured to estimate a bias introduced by the filter; and
a parameter generator configured to compute a parameter of the communications channel as a function of the estimated bias,
further comprising a mean square error estimator configured to estimate the mean square error of the signal, the parameter generator further being configured to compute the parameter of the communications channel as a function of the estimated mean square error.

16. A receiver, comprising:
a filter configured to filter a signal from a communications channel;
a bias estimator configured to estimate a bias introduced by the filter; and
a parameter generator configured to compute a parameter of the communications channel as a function of the estimated bias,
wherein the parameter comprises a carrier-to-interference ratio.

17. A receiver, comprising:
a filter configured to filter a signal from a communications channel;
a bias estimator configured to estimate a bias introduced by the filter; and
a parameter generator configured to compute a parameter of the communications channel as a function of the estimated bias,
wherein the filter is further configured to generate a plurality of symbol estimates from the signal, and the parameter generator is configured to compute the carrier-to-interference ratio by solving the following equation:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \alpha_{re})^2 \cdot \frac{1}{N} \sum_{k=1}^{N} \{\|y(k)\|^2\}}$$

where:
y(k) represents a plurality of second symbols corresponding to the symbol estimates;

N represents the number of samples; and $\hat{\alpha}_{re}$ represents the real component of the estimated bias.

18. Computer-readable media embodying a program of instructions executable by a computer to perform a method of measuring performance of a communications channel from a filtered signal, the method comprising:

estimating a bias introduced by the filtering of the signal; and computing a parameter of the communications channel as a function of the estimated bias, wherein the filtered signal comprises a plurality of symbol estimates, and the bias estimation is a function of the symbol estimates.

19. The computer-readable media of claim 18 wherein the bias estimation is further a function of a plurality of second symbols corresponding to the symbol estimates.

20. The computer-readable media of claim 18 wherein the bias estimation further comprises solving the following equation:

$$\hat{\alpha}_{re} = \mathrm{Re}\left\{\frac{1}{N}\sum_{k=1}^{N}\frac{\hat{y}(k)}{y(k)}\right\}$$

where:

$\hat{y}(k)$ represents the estimated symbols;

y(k) represents the corresponding second symbols; and

N represents the number of samples.

21. Computer-readable media embodying a program of instructions executable by a computer to perform a method of measuring performance of a communications channel from a filtered signal, the method comprising:

estimating a bias introduced by the filtering of the signal; and computing a parameter of the communications channel as a function of the estimated bias, wherein the method further comprises estimating a mean square error of the signal, the parameter computation further being a function of the estimated means square error.

22. Computer-readable media embodying a program of instructions executable by a computer to perform a method of measuring performance of a communications channel from a filtered signal, the method comprising:

estimating a bias introduced by the filtering of the signal; and computing a parameter of the communications channel as a function of the estimated bias, wherein the parameter computation further comprises computing a carrier-to-interference ratio of the signal.

23. The computer-readable media of claim 22 wherein the filtered signal comprises a plurality of symbol estimates, and the carrier-to-interference ratio computation comprises solving the following equation:

$$\frac{\hat{C}}{I} = \frac{\hat{\alpha}_{re}^2\left\{\frac{1}{N}\sum_{k=1}^{N}\|y(k)\|^2\right\}}{\widehat{MSE} - (1-\alpha_{re})^2 \cdot \frac{1}{N}\sum_{k=1}^{N}\{\|y(k)\|^2\}}$$

where:

y(k) represents a plurality of second symbols corresponding to the symbol estimates;

N represents the number of samples; and $\hat{\alpha}_{re}$ represents the real component of the estimated bias.

24. A receiver, comprising:

filter means for filtering a signal from a communications channel, wherein the filter means comprises a linear filter;

bias estimator means for estimating a bias introduced by the filter means; and parameter computation means for computing a parameter of the communications channel as a function of the estimated bias, wherein the linear filter comprises a plurality of coefficients configured to be adapted by a least mean square algorithm.

25. The receiver of claim 24 wherein the filter means comprises a finite impulse response filter.

26. The receiver of claim 24 wherein the filter means comprises an equalizer.

27. The receiver of claim 24 wherein the filter means comprises a RAKE receiver.

28. A receiver, comprising:

filter means for filtering a signal from a communications channel;

bias estimator means for estimating a bias introduced by the filter means; and parameter computation means for computing a parameter of the communications channel as a function of the estimated bias, wherein the filter means further comprises means for estimating a plurality of symbols from the signal, the estimated bias further being a function of the symbol estimates.

29. The receiver of claim 28 wherein the estimated bias is further a function of a plurality of second symbols corresponding to the symbol estimates.

30. The receiver of claim 29 wherein the bias estimator means is configured to estimate the bias introduced by the filter by solving the following equation:

$$\hat{\alpha}_{re} = \mathrm{Re}\left\{\frac{1}{N}\sum_{k=1}^{N}\frac{\hat{y}(k)}{y(k)}\right\}$$

where:

$\hat{y}(k)$ represents the estimated symbols;

y(k) represents the corresponding second symbols; and

N represents the number of samples.

31. A receiver, comprising:

filter means for filtering a signal from a communications channel;

bias estimator means for estimating a bias introduced by the filter means;

parameter computation means for computing a parameter of the communications channel as a function of the estimated bias; and means for estimating a mean square error of the signal, the parameter computation means further being configured to compute the parameter of the communications channel as a function of the estimated mean square error.

32. A receiver, comprising:

filter means for filtering a signal from a communications channel;

bias estimator means for estimating a bias introduced by the filter means; and parameter computation means for computing a parameter of the communications channel as a function of the estimated bias, wherein the parameter comprises a carrier-to-interference ratio.

33. The receiver of claim 32 wherein the filter means further comprises means for estimating a plurality of symbols from the signal, and the parameter computation means is configured to compute the carrier-to-interference ratio by solving the following equation:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \alpha_{re})^2 \cdot \frac{1}{N} \sum_{k=1}^{N} \{\|y(k)\|^2\}}$$

where:
y(k) represents a plurality of second symbols corresponding to the symbol estimates;
N represents the number of samples; and
$\hat{\alpha}_{re}$ represents the real component of the estimated bias.

34. A communications system, comprising:
a first station having a filter configured to filter a signal from a communications channel, a bias estimator configured to estimate a bias introduced by the filter, and a parameter generator configured to compute a parameter of the communications channel as a function of the estimated bias; and
a second station configured to transmit the signal to the first station over the communications system at a data rate selected from a plurality of different data rates, the selected data rate being a function of the computed parameter.

35. The communications system of claim 34 wherein the filter comprises an equalizer.

36. The communications system of claim 34 wherein the filter comprises a RAKE receiver.

37. The communications system of claim 34 wherein the filter is further configured to generate a plurality of symbol estimates from the signal, the estimated bias further being a function of the symbol estimates.

38. The communications system of claim 37 wherein the signal transmitted by the second station to the first station over the communications channel comprises a pilot signal, and the first station further comprises a demodulator configured to extract the pilot signal, the symbol estimates being a function of the extracted pilot signal.

39. The communications system of claim 38 further comprising memory configured to store a plurality of second signals corresponding the pilot signal transmitted by the second station, the estimated bias being further a function of the second symbols.

40. The communications system of claim 39 wherein the parameter generator is configured to estimate the bias introduced by the filter by solving the following equation:

$$\hat{\alpha}_{re} = \text{Re}\left\{ \frac{1}{N} \sum_{k=1}^{N} \frac{\hat{y}(k)}{y(k)} \right\}$$

where:
ŷ(k) represents the estimated symbols;
y(k) represents the corresponding second symbols; and
N represents the number of samples.

41. The communications system of claim 34 further comprising a mean square error estimator configured to estimate a mean square error of the signal, the parameter computation further being a function of the estimated mean square error.

42. The communications system of claim 34 wherein the parameter comprises a carrier-to-interference ratio.

43. The communications system of claim 42 wherein the filter is further configured to generate a plurality of symbol estimates from the signal, and the parameter generator is configured to compute the carrier-to-interference ratio by solving the following equation:

$$\frac{\hat{C}}{I} = \frac{\hat{\alpha}_{re}^2 \left\{ \frac{1}{N} \sum_{k=1}^{N} \|y(k)\|^2 \right\}}{\hat{MSE} - (1 - \alpha_{re})^2 \cdot \frac{1}{N} \sum_{k=1}^{N} \{\|y(k)\|^2\}}$$

where:
y(k) represents a plurality of second symbols corresponding to the symbol estimates;
N represents the number of samples; and
$\hat{\alpha}_{re}$ represents the real component of the estimated bias.

44. The communications system of claim 42 further comprising a data rate control generator configured to generate a data rate request message as a function of the computed carrier-to-interference ratio.

45. The communications system of claim 44 further comprising a modulator configured to puncture a data packet with the data rate request message and modulate the punctured data packet for transmission from the first station to the second station.

46. The communications system of claim 45 wherein the second station comprises a channel element configured to extract the data rate request message from the punctured data packet transmitted to the second station, the selected data rate being a function of the extracted data rate request message.

47. The communications system of claim 34 further comprising a data rate control generator configured to generate a data rate request message as a function of the computed parameter.

48. The communications system of claim 47 further comprising a modulator configured to puncture a data packet with the data rate request message and modulate the punctured data packet for transmission from the first station to the second station.

49. The communications system of claim 46 wherein the second station comprises a channel element configured to extract the data rate request message from the punctured data packet transmitted to the second station, the selected data rate being a function of the extracted data rate request message.

50. The communications system of claim 42 wherein the first station comprises a mobile subscriber station and the second station comprises a base station.

51. A method of communications, comprising:
receiving, at a first station, a signal from a second station over a communications channel;
filtering the signal at the first station;
estimating, at the first station, a bias introduced by the filtering of the signal;

computing, at the first station, a parameter of the communications channel as a function of the estimated bias; and transmitting from the second station to the first station the signal at a data rate selected from a plurality of different data rates, the selected data rate being a function of the computed parameter.

52. The method of claim 51 wherein the signal filtering comprises generating a plurality of symbol estimates, the bias estimation being a function of the symbol estimates.

53. The method of claim 52 wherein the signal transmitted from the second station to the first station comprises a pilot signal.

54. The method of claim 53 further comprising, at the first station, extracting the pilot signal transmitted from the second station, wherein the symbol estimates are a function of the extracted pilot signal.

55. The method of claim 54 wherein the bias estimation is further a function of a plurality of second symbols corresponding to the pilot signal transmitted from the second station.

56. The method of claim 55 wherein the bias estimation further comprises solving the following equation:

$$\hat{\alpha}_{re} = \text{Re}\left\{\frac{1}{N}\sum_{k=1}^{N}\frac{\hat{y}(k)}{y(k)}\right\}$$

where:

$\hat{y}(k)$ represents the estimated symbols;

$y(k)$ represents the corresponding second symbols; and

N represents the number of samples.

57. The method of claim 51 further comprising estimating, at the first station, a mean square error of the signal, the parameter computation further being a function of the estimated means square error.

58. The method of claim 51 wherein the parameter computation further comprises computing a carrier-to-interference ratio of the signal.

59. The method of claim 58 wherein the signal filtering comprises generating a plurality of symbol estimates, and the carrier-to-interference ratio computation comprises solving the following equation:

$$\frac{\hat{C}}{I} = \frac{\hat{\alpha}_{re}^2\left\{\frac{1}{N}\sum_{k=1}^{N}\|y(k)\|^2\right\}}{\widehat{MSE} - (1-\alpha_{re})^2 \cdot \frac{1}{N}\sum_{k=1}^{N}\{\|y(k)\|^2\}}$$

where:

y(k) represents a plurality of second symbols corresponding to the symbol estimates;

N represents the number of samples; and $\hat{\alpha}_{re}$ represents the real component of the estimated bias.

60. The method of claim 59 further comprising generating, at the first station, a data rate request message as a function of the computed carrier-to-interference ratio.

61. The method of claim 60 further comprising puncturing, at the first station, a data packet with the data rate request message.

62. The method of claim 60 further comprising modulating, at the first station, the punctured data packet for transmission to the second station.

63. The method of claim 62 further comprising extracting, at the second station, the data rate request message from the punctured data packet transmitted from the first station, the selected data rate being a function of the extracted data rate request message.

64. The method of claim 51 further comprising generating a data rate request message as a function of the computed parameter.

65. The method of claim 64 further comprising puncturing, at the first station, a data packet with the data rate request message.

66. The method of claim 65 further comprising modulating, at the first station, the punctured data packet for transmission to the second station.

67. The method of claim 66 further comprising extracting, at the second station, the data rate request message from the punctured data packet transmitted from the first station, the selected data rate being a function of the extracted data rate request message.

68. The method of claim 51 wherein the first station comprises a mobile subscriber station and the second station comprises a base station.

* * * * *